US012640298B2

(12) United States Patent
Im et al.

(10) Patent No.: US 12,640,298 B2
(45) Date of Patent: May 26, 2026

(54) SOLENOID ACTUATOR AND MULTI-SOLENOID ACTUATOR EXERTING CONSTANT FORCE

(71) Applicant: PUKYONG NATIONAL UNIVERSITY INDUSTRY-UNIVERSITY COOPERATION FOUNDATION, Busan (KR)

(72) Inventors: Do Jin Im, Busan (KR); Seo Jun Bae, Busan (KR); Sun Jun Lee, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 313 days.

(21) Appl. No.: 18/304,645

(22) Filed: Apr. 21, 2023

(65) Prior Publication Data

US 2023/0343500 A1 Oct. 26, 2023

(30) Foreign Application Priority Data

Apr. 22, 2022 (KR) ........................ 10-2022-0049862

(51) Int. Cl.
*H01F 7/08* (2006.01)
*H01F 7/06* (2006.01)

(52) U.S. Cl.
CPC ............. *H01F 7/081* (2013.01); *H01F 7/064* (2013.01); *H01F 2007/086* (2013.01)

(58) Field of Classification Search
CPC .... H01F 7/081; H01F 7/064; H01F 2007/086; H01F 2007/185; H01F 7/1844; H01F 7/1615; H01F 2007/1692; H01F 7/1646
(Continued)

(56) References Cited

U.S. PATENT DOCUMENTS 5,487,407 A * 1/1996 Eaker ....................... F01N 3/222
335/274
5,526,837 A * 6/1996 Eaker .................. F16K 31/0655
251/129.21
(Continued)

FOREIGN PATENT DOCUMENTS

JP 2006296144 10/2006
KR 20090123984 12/2009
(Continued)

OTHER PUBLICATIONS

Office Action issued in Corresponding Korean Application No. 10-2022-0049862, dated Dec. 5, 2023 (English Translation provided).

*Primary Examiner* — Shawki S Ismail
*Assistant Examiner* — Lisa N Homza
(74) *Attorney, Agent, or Firm* — NORTON ROSE FULBRIGHT US LLP

(57) ABSTRACT

Disclosed are a solenoid actuator and a multi-stage solenoid actuator for transmitting a constant force. The solenoid actuator includes a tubular solenoid, a power unit capable of applying current to the solenoid, and a magnetic pair member having two magnetic members providing magnetic fields formed such that respective first poles thereof face each other and respective second poles thereof different from the first poles are located at both distal ends, and extending through the tub of the solenoid. The multi-stage solenoid actuator includes a solenoid assembly where at least two tubular solenoids are regularly aligned such that inner spaces of the tubes of the solenoids are arranged in series, a power unit capable of individually applying current to each solenoid of the solenoid assembly, at least one magnetic pair moveable unit having two magnetic members providing magnetic fields formed such that respective first poles thereof face each other and respective second poles thereof
(Continued)

different from the first poles are located at both distal ends, and extending through the tub of the solenoid assembly, and a controller for determining and controlling a solenoid to receive the current from the power unit depending on a position of the magnetic pair moveable unit.

5 Claims, 6 Drawing Sheets

(58) Field of Classification Search
USPC ........................................................... 335/279
See application file for complete search history.

(56) References Cited

U.S. PATENT DOCUMENTS 5,947,155 A * 9/1999 Miki .................. G05D 16/2024 335/229
10,181,373 B2 * 1/2019 Mecklenburg ......... H01H 50/20
2006/0049701 A1 * 3/2006 Sato ....................... H02K 33/12 310/12.21
2007/0120633 A1 * 5/2007 Sakurai ................. H01F 7/1615 335/256
2010/0126454 A1 * 5/2010 Heusel ................. H01H 51/065 123/179.25
2011/0168933 A1 * 7/2011 Shimizu ................ H01F 7/1607 251/129.15
2012/0080624 A1 * 4/2012 Stahr ................... F16K 31/0665 335/277
2012/0153633 A1 * 6/2012 Kolbenschlag ..... F16K 37/0041 290/1 A
2014/0002217 A1 * 1/2014 Stahr ....................... B60T 8/363 335/209
2015/0270766 A1 * 9/2015 Mecklenburg .......... H01F 7/066 310/12.24
2016/0144404 A1 * 5/2016 Houston ................ H02K 33/00 318/114
2020/0281673 A1 * 9/2020 Suzuki ................... A61B 17/29
2021/0088154 A1 * 3/2021 Davis .................... F16K 31/086

FOREIGN PATENT DOCUMENTS

KR 20170053884 5/2017
WO WO-2008139646 A1 * 11/2008 ............. H02K 35/02

* cited by examiner

SOLENOID ACTUATOR AND MULTI-SOLENOID ACTUATOR EXERTING CONSTANT FORCE

CROSS-REFERENCE TO RELATED APPLICATION

This application claims a benefit under 35 U.S.C. § 119(a) of Korean Patent Application No. 10-2022-0049862 filed on Apr. 22, 2022, on the Korean Intellectual Property Office, the entire disclosure of which is incorporated herein by reference for all purposes.

BACKGROUND

1. Field

The present disclosure relates to a solenoid actuator and a multi-stage solenoid actuator exerting a constant force.

2. Description of Related Art

It is known that a magnet inside a solenoid through which current flows receives a force in an axial direction of the solenoid. The force that the magnet receives from the solenoid continuously varies depending on a position of the magnet on the axis of the solenoid. Because of such property, an actuator capable of converting electrical energy into mechanical kinetic energy using the solenoid and the magnet has a problem in that a magnitude and a direction of a force applied by the actuator continuously vary depending on the position of the magnet. To solve such problem, the present disclosure discloses a technique for creating a section in which the force received by the magnet becomes constant inside the solenoid using a pair of magnets facing each other with the same poles, and extending such a section as desired using a multi-stage solenoid.

SUMMARY

A purpose of the present disclosure is to provide a solenoid actuator in which a section for transmitting a constant force exists.

Another purpose of the present disclosure is to provide a multi-stage solenoid actuator extended as much as a desired length using the actuator so as to transmit the constant force.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

A first aspect of the present disclosure provides a solenoid actuator for transmitting a constant force, the solenoid actuator comprising: a tubular solenoid; a power unit capable of applying current to the solenoid; and a magnetic pair member having two magnetic members providing magnetic fields formed such that respective first poles thereof face each other and respective second poles thereof different from the first poles are located at both distal ends, and extending through the tub of the solenoid, wherein one of a distance between the first poles and a distance between the second poles of the respective two magnetic members is 0.9 to 1.1 times the length of the tube of the solenoid.

In one implementation of the first aspect, the solenoid actuator further includes a spacer disposed and fixed between the two magnetic members to keep a distance between the two magnetic members constant when the first poles of the respective two magnetic members are spaced apart from each other.

In one implementation of the first aspect, the distance between the first poles of the respective two magnetic members is about 0.9 to 1.1 times the length of the tube of the solenoid, and a length of each of the two magnetic members is about 0.9 to 3 times the length of the tube of the solenoid.

With the limitation of the numerical value as described above, the section in which the magnetic member in the solenoid receives the constant force may be implemented.

In one implementation of the first aspect, a length of each of the two magnetic members is about 0.9 to 1.1 times the length of the tube of the solenoid.

With the limitation of the numerical value as described above, the space efficiency of the actuator may be implemented.

In one implementation of the first aspect, the distance between the second poles of the respective two magnetic members is about 0.9 to 1.1 times the length of the tube of the solenoid, and a length of each of the two magnetic members is equal to or smaller than about 0.55 times the length of the tube of the solenoid.

With the limitation of the numerical value as described above, the section in which the magnetic member in the solenoid receives the constant force may be implemented.

In one implementation of the first aspect, all of the solenoid and the two magnetic members are cylindrical, and the length of each of the two magnetic members is smaller than about 0.55 times the length of the tube of the solenoid by about 0.09 to 0.11 times the diameter of the cylinder of the magnetic member.

In one implementation of the first aspect, the length of the solenoid is about 2.3 to 2.7 times the diameter of the cylinder of the magnetic member, and the length of each of the two magnetic members is about 1.0 to 1.2 times the diameter of the cylinder of the magnetic member.

With the limitation of the numerical value as described above, the actuator according to the present disclosure may maximize the length and the space efficiency of the section for receiving the constant force.

A second aspect of the present disclosure provides a multi-stage solenoid actuator for transmitting a constant force, the multi-stage solenoid actuator comprising: a solenoid assembly where at least two tubular solenoids are regularly aligned such that inner spaces of the tubes of the solenoids are arranged in series; a power unit capable of individually applying current to each solenoid of the solenoid assembly; at least one magnetic pair moveable unit having two magnetic members providing magnetic fields formed such that respective first poles thereof face each other and respective second poles thereof different from the first poles are located at both distal ends, and extending through the tub of the solenoid assembly; and a controller that determines and controls a solenoid to receive the current from the power unit depending on a position of the magnetic pair moveable unit.

With the configuration as described above, the multi-stage solenoid actuator, which is one aspect of the present disclosure, may extend the section in which the constant force is maintained in the solenoid actuator, which is another aspect of the present disclosure, by the desired length.

In one implementation of the second aspect, the multi-stage solenoid actuator further includes a spacer disposed and fixed between the two magnetic members to keep a distance between the two magnetic members constant when the first poles of the respective two magnetic members are spaced apart from each other.

In one implementation of the second aspect, the controller controls the power unit such that the current is applied to up to x consecutive solenoids among a series of solenoids included in the solenoid assembly, a length of each solenoid included in the solenoid assembly is smaller than a length of a section where the magnetic pair moveable unit receives a force within a predetermined error range of a force received when a center line of the magnetic pair moveable unit is located at an axial center of the x consecutive solenoids while the magnetic pair moveable unit passes through the x consecutive solenoids, and the x is a natural number smaller than or equal to the number of solenoids included in the solenoid assembly.

With the limitation as described above, the multi-stage solenoid actuator may implement the section for receiving the constant force for each solenoid.

In one implementation of the second aspect, the length of each solenoid is determined and each solenoid is disposed such that a total length including lengths of the x solenoids and spacings therebetween is about 90 to 110% of a distance between the first poles or the second poles of the magnetic pair moveable unit.

With the limitation as described above, an end surface of the solenoid to which the current is applied may be as close as possible to each first pole or each second pole of the magnetic pair moveable unit.

In one implementation of the second aspect, the controller controls the power unit such that the current is applied to the total of x solenoids symmetrically from the center line of the magnetic pair moveable unit.

With the control as described above, control for the solenoid to which the current is applied in the solenoid assembly to follow the position of the magnetic pair moveable unit may be implemented.

In one implementation of the second aspect, the controller includes at least one magnetism sensing unit capable of converting the magnetic field into a signal and outputting the signal, and each magnetism sensing unit is disposed and adjusted such that control of the power unit based on a position of the center line of the magnetic pair movable unit is realized depending on the signal output from the magnetism sensing unit.

In one implementation of the second aspect, each magnetism sensing unit is disposed at an equal position for each solenoid included in the solenoid assembly, when an intensity of the magnetic field recognized from the signal output from each magnetism sensing unit is equal to or greater than a predetermined value, the current is controlled to be applied to a corresponding solenoid, and when the intensity of the magnetic field recognized from the signal output from each magnetism sensing unit is smaller than the predetermined value, the current is controlled so as not to be applied to the corresponding solenoid.

With the control scheme as described above, each solenoid and each magnetism sensing unit may be constructed as one cell, so that the actuator capable of constantly applying the force to the magnetic pair movable unit as much as the desired length via the continuous extension may be implemented.

The magnetism sensing unit may be a hall sensor.

With the solenoid actuator according to the embodiment of the present disclosure, the section in which the pair of magnets in the solenoid receive the constant force may be realized.

With the multi-stage solenoid actuator according to the embodiment of the present disclosure, the section for receiving the constant force may be extended as much as desired.

In addition to the effects as described above, specific effects in accordance with the present disclosure will be described together with the detailed description for carrying out the disclosure.

DETAILED DESCRIPTIONS

Figure 1:
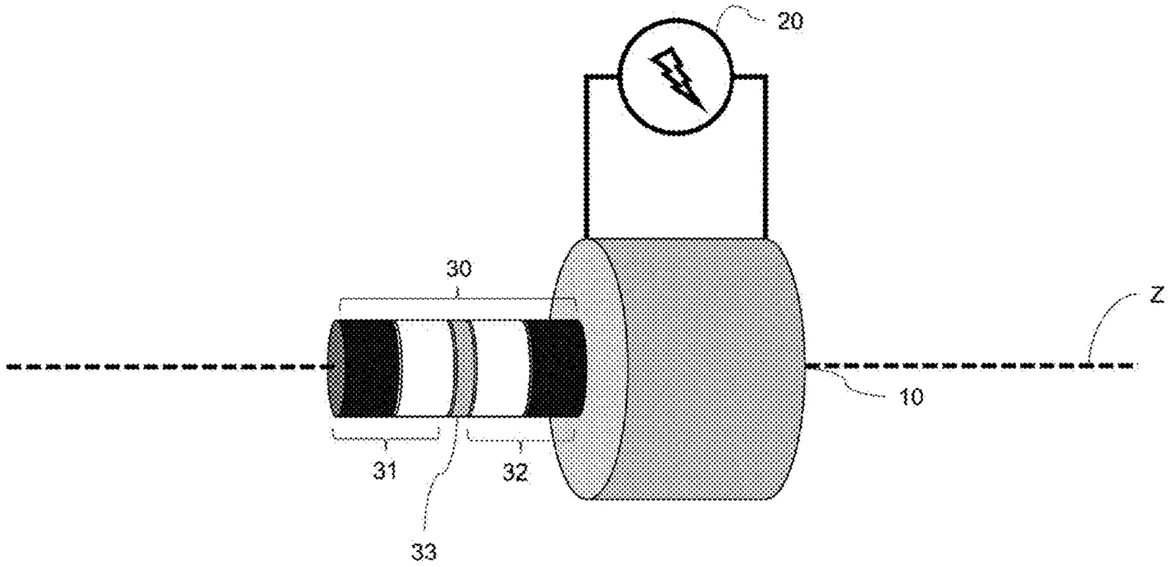
FIG. 1 is a diagram showing an example of a solenoid actuator according to an embodiment of the present disclosure.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure may not be limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated.

The features of the various embodiments of the present disclosure may be partially or entirely combined with each other, and may be technically associated with each other or operate with each other. The embodiments may be implemented independently of each other and may be implemented together in an association relationship.

FIG. 1 is a diagram showing an example of a solenoid actuator according to an embodiment of the present disclosure.

Referring to FIG. 1, a solenoid actuator according to an embodiment of the present disclosure may include a tubular solenoid 10; a power unit 20 capable of applying current to the solenoid 10; and a magnetic pair member 30 having two magnetic members 31 and 32 providing magnetic fields formed such that respective first poles thereof face each other and respective second poles thereof different from the first poles are located at both distal ends, and extending through the tub of the solenoid.

Herein, the "solenoid" means a device made by winding an electrically conductive wire several times into a tubular shape. Although the solenoid 10 in FIG. 1 is shown in a cylindrical shape, this is exemplary. A cross-section of the solenoid tube is not limited to a circle and all shapes are possible for the cross-section.

Herein, the "magnetic member" is an object capable of providing the magnetic field, and non-limiting examples thereof include a permanent magnet or an electromagnet. The magnetic members 31 and 32 in FIG. 1 are shown in a form recognizable to a person skilled in the art as the permanent magnet, but this is exemplary and the magnetic members 31 and 32 are not limited thereto. In one embodiment, the magnetic member may be the permanent magnet.

When the current is applied to the solenoid 10, a magnetic field is formed inside the solenoid tube. When the magnetic member capable of providing another magnetic field is located along an axis (Z) inside the solenoid tube where the magnetic field is formed, the solenoid may apply a force to the magnetic member in a direction of the axis (Z) of the solenoid tube. Therefore, an actuator capable of applying a force in one direction or both directions may be implemented.

The two magnetic members 31 and 32 may be disposed such that the same poles thereof face each other. In FIG. 1, red zones of the magnetic members 31 and 32 are the same pole, and blue zones of the magnetic members 31 and 32 are the same pole. FIG. 1 shows that the red zones face each other and the blue zones are located at both distal ends, and the red zone may be recognized as an N pole and the blue zone may be recognized as an S pole from a point of view of those skilled in the art, but the present disclosure may not be limited thereto. The magnetic pair member 30 according to the present disclosure may be disposed such that the S poles of the respective magnetic members 31 and 32 face each other and the N poles thereof are located at both distal ends.

Figure 2:
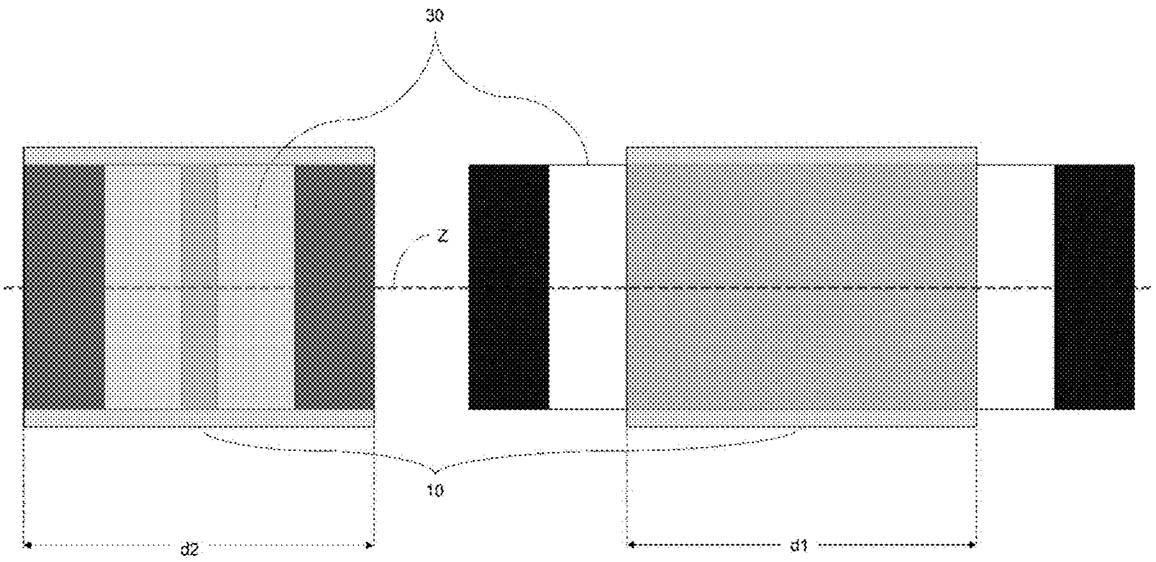
FIG. 2 is a front view of a solenoid actuator according to the present disclosure viewed from a direction perpendicular to an axis (Z) of a solenoid tube.

FIG. 2 is a front view of a solenoid actuator according to the present disclosure viewed from a direction perpendicular to an axis (Z) of a solenoid tube.

Referring to FIG. 2, one of a distance d1 between the first poles and a distance d2 between the second poles of the respective two magnetic members 31 and 32 may be about 0.9 to 1.1 times, for example, about 0.95 to 1.05 times the length of the tube of the solenoid 10. For example, one of the distance d1 between the first poles and the distance d2 between the second poles of the respective two magnetic members 31 and 32 may be substantially the same as the length of the tube of the solenoid 10. FIG. 2 shows such case, but the present disclosure is not limited thereto. In FIG. 2, the power unit is omitted.

Continuing to refer to FIG. 1, when the first poles of the respective two magnetic members 31 and 32 are spaced apart from each other, the solenoid actuator may further include a spacer 33 disposed and fixed between the two magnetic members to keep a distance between the two magnetic members 31 and 32 constant.

Figure 3:
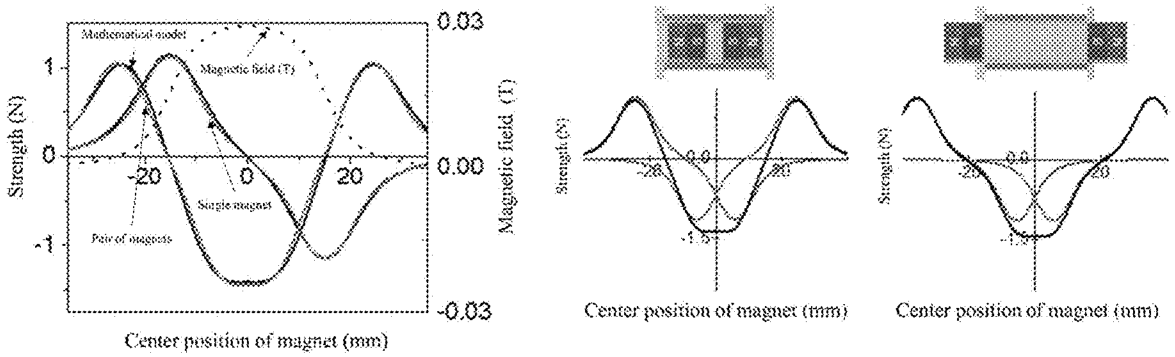
FIG. 3 shows diagrams and graphs showing a principle of applying a constant force by an actuator using two magnetic members.

FIG. 3 shows diagrams and graphs showing a principle of applying a constant force by an actuator using two magnetic members as described above. A left side of FIG. 3 is a graph showing magnitudes of forces received by a single magnet and magnetic members including a pair of magnets within the solenoid, an upper right end of FIG. 3 is a diagram showing relative positions of the solenoid and the magnetic members, and a graph below the same is a graph showing forces received by the magnetic members in each case. In each graph, green and yellow lines represent the forces received by the respective two magnetic members, and a black line represents a sum of the forces received by the two magnetic members.

Referring to FIG. 3, when the distance between the first poles of the respective two magnetic members is equal to the solenoid length or the distance between the second poles of the respective two magnetic members is equal to the solenoid length, a section where the magnetic pair member receives a constant force appears at a center of the solenoid tube. That is, when one of the distance between the first poles and the distance between the second poles of the respective two magnetic members is about 0.9 to 1.1 times the length of the solenoid tube, the section where the magnetic pair member receives the constant force of a certain level may be substantially implemented at the center of the solenoid.

In a state in which the above condition is met, other geometrical parameters of the magnet and the solenoid may be selected depending on a use of the actuator or the like. In one embodiment, the distance between the first poles of the respective two magnetic members may be about 0.9 to 1.1 times the length of the solenoid tube, and a length of each of the two magnetic members may be about 0.9 to 3 times the length of the solenoid tube. For example, the length of each of the two magnetic members may be about 0.9 to 1.1 times the length of the solenoid tube.

In one embodiment, the distance between the second poles of the respective two magnetic members may be about 0.9 to 1.1 times the length of the solenoid tube, and the length of each of the two magnetic members may be equal to or smaller than about 0.55 times the length of the solenoid tube.

In one embodiment, all of the solenoid and the two magnetic members may be cylindrical, and the length of each of the two magnetic members may be smaller by about 0.09 to 0.11 times the diameter of the cylinder of the magnetic member than about 0.55 times the length of the solenoid tube.

In one embodiment, the length of the solenoid may be about 2.3 to 2.7 times the diameter of the cylinder of the magnetic member, and the length of each of the two magnetic members may be about 1.0 to 1.2 times the diameter of the cylinder of the magnetic member.

The limitation of the numerical value as described above is for maximizing a length of the section receiving the constant force and a space efficiency, and a basis for the limitation will be understood by those skilled in the art via a following experimental example or the like.

As described above, the section in which the pair of magnets in the solenoid receive the constant force may be implemented via the solenoid actuator according to an embodiment of the present disclosure.

Figure 4:
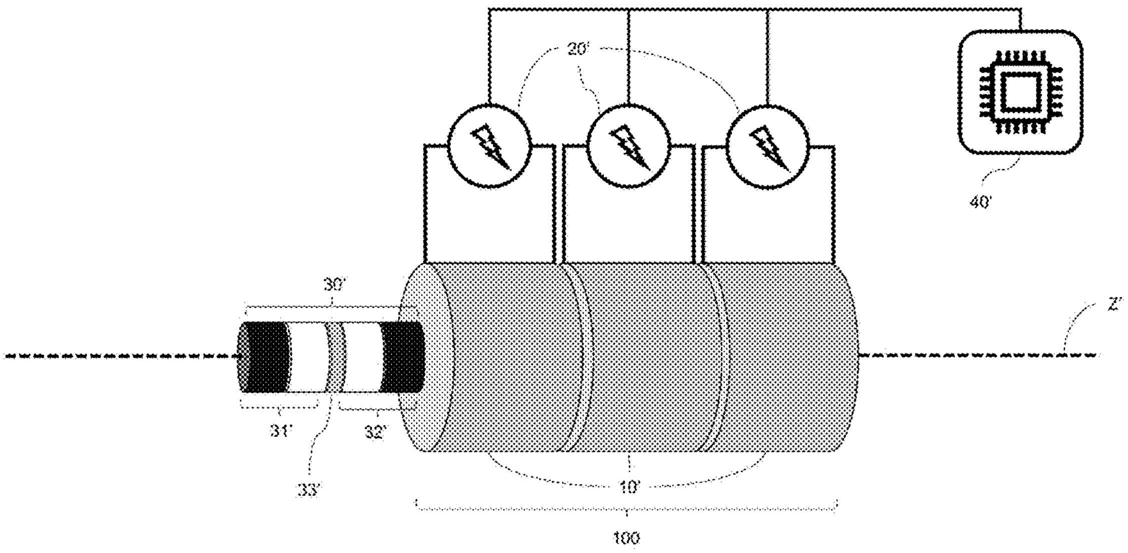
FIG. 4 is a diagram showing an example of a multi-stage solenoid actuator according to an embodiment of the present disclosure.

FIG. 4 is a diagram showing an example of a multi-stage solenoid actuator according to an embodiment of the present disclosure.

Referring to FIG. 4, the multi-stage solenoid actuator according to the embodiment of the present disclosure may include a solenoid assembly 100 in which at least two tubular solenoids 10' are regularly aligned such that inner spaces of the tubes of the solenoids 10' are arranged in series; a power unit 20' capable of individually applying current to each solenoid 10' of the solenoid assembly 100; at least one magnetic pair moveable unit 30' having two magnetic members 31' and 32' providing magnetic fields formed such that respective first poles thereof face each other and respective second poles thereof different from the first poles are located at both distal ends, and extending through the tub of the solenoid assembly 100; and a controller 40' that determines and controls a solenoid to which the power unit applies the current depending on a position of the magnetic pair moveable unit 30'.

With the above configuration, the multi-stage solenoid actuator, which is one aspect of the present disclosure, may extend the section in which the constant force is maintained in the solenoid actuator, which is another aspect of the present disclosure, by a desired length.

When the first poles of the respective two magnetic members 31' and 32' are spaced apart from each other, the magnetic pair moveable unit may further include a spacer 33' disposed and fixed between the two magnetic members 31' and 32' to keep a distance between the two magnetic members 31' and 32' constant.

Figure 5:
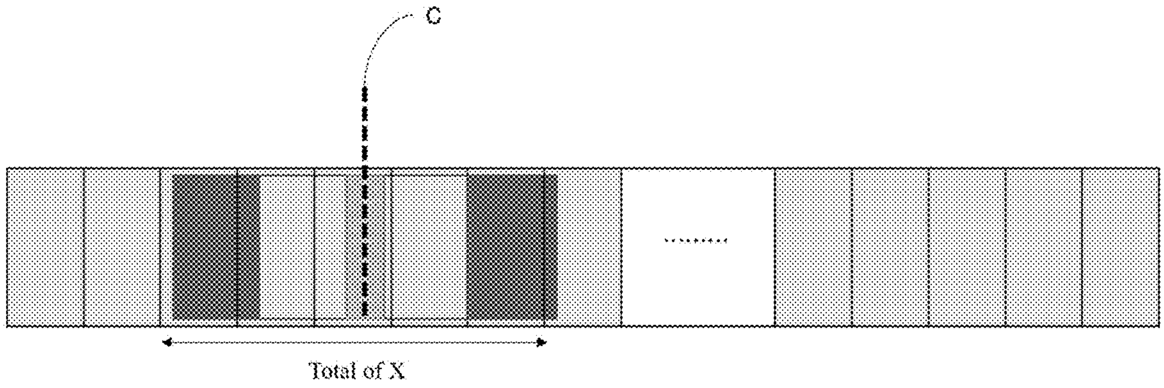
FIG. 5 is a diagram showing one embodiment of a method for the controller to control the power unit.

FIG. 5 is a diagram showing one embodiment of a method for the controller to control the power unit.

Referring to FIGS. 4 and 5 together, the controller 40' may control the power unit 20' such that current is applied to up to x consecutive solenoids among a series of solenoids included in the solenoid assembly 100.

Figure 6:
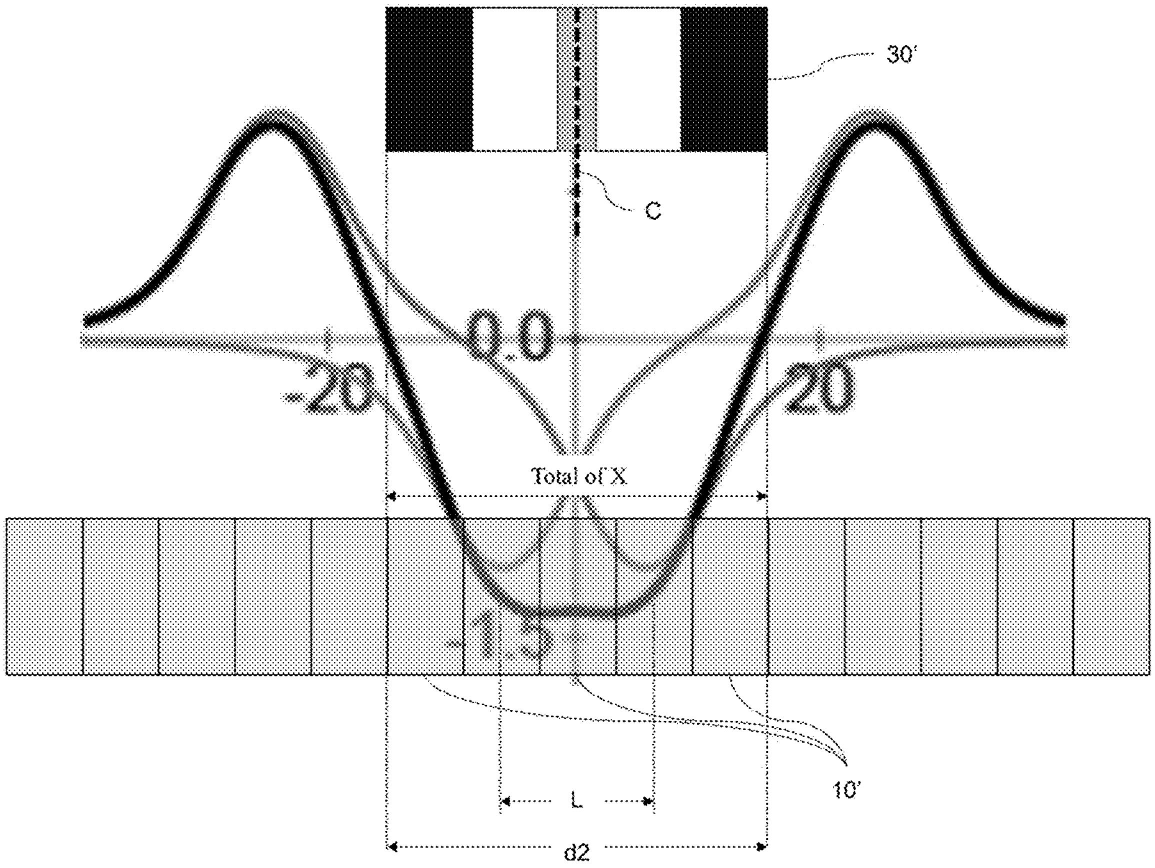
FIG. 6 is a diagram showing a method for determining a length of each solenoid under control of a controller.

FIG. 6 is a diagram showing a method for determining a length of each solenoid when the controller provides the above control.

Referring to FIGS. 4, 5, and 6 together, the length of each solenoid included in the solenoid assembly may be smaller than a length L of a section in which the magnetic pair moveable unit 30' receives a force within a predetermined error range of a force received when a center line C of the magnetic pair moveable unit 30' is located at an axial center of the x consecutive solenoids while the magnetic pair moveable unit 30' passes through the x consecutive solenoids, and the x may be a natural number smaller than or equal to the number of solenoids included in the solenoid assembly.

With the limitation as described above, the multi-stage solenoid actuator may implement the section for receiving the constant force for each solenoid and may extend such section.

As shown in FIG. 3, a total length of the solenoid to which the current is applied is closer to the distance between the first poles or the second poles of the magnetic pair moveable unit, the section for receiving the constant force becomes longer. Therefore, a length of the solenoid that minimizes a change in the received force within the section where the magnetic pair moveable unit receives the constant force may be derived.

Continuing to refer to FIG. 6 together with FIG. 3, the length of each solenoid 10' may be determined and each solenoid 10' may be disposed such that the total length including lengths of the x solenoids and spacings therebetween is about 90 to 110% of the distance between the first poles or the second poles (in case of FIG. 6, the distance between the second poles; d2) of the magnetic pair moveable unit 30'. Referring to FIG. 6, it may be seen that distal ends of a portion marked with the x solenoids substantially coincide with the second poles of the magnetic pair moveable unit 30', respectively. With the limitation as described above, an end surface of the solenoid to which the current is applied may be as close as possible to each first pole or each second pole of the magnetic pair moveable unit.

The controller may control the power unit such that the current is applied to the total of x solenoids symmetrically from the center line of the magnetic pair moveable unit. When the magnetic pair moveable unit is located at a center of the solenoid to which the current is applied, it is included in the section for receiving the constant force. Therefore, when a section of the solenoid to which the current is applied as the magnetic pair moveable unit moves is implemented to follow the movement of the magnetic pair moveable unit, the section for receiving the constant force may be continuously extended. With the control as described above, control for the solenoid to which the current is applied in the solenoid assembly to follow the position of the magnetic pair moveable unit may be implemented. The implementation of the principle as described above will become more apparent in a following experimental example.

Figure 7:
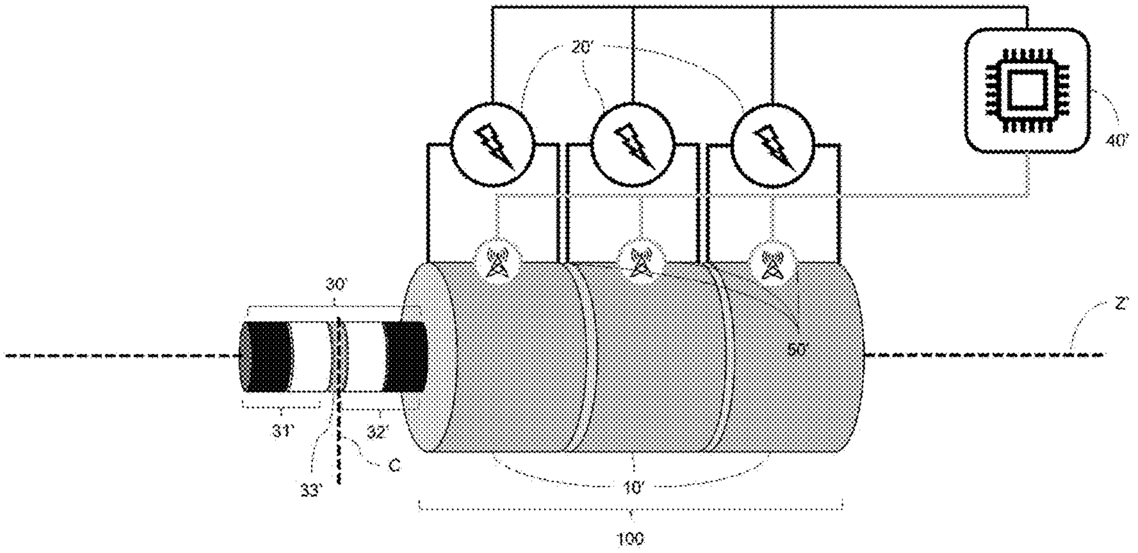
FIG. 7 is a diagram showing another example of a multi-stage solenoid actuator according to an embodiment of the present disclosure.

FIG. 7 is a diagram showing another example of a multi-stage solenoid actuator according to an embodiment of the present disclosure.

Referring to FIG. 7, the controller 40' may include at least one magnetism sensing unit 50' capable of converting a magnetic field into a signal and outputting the signal. Each magnetism sensing unit 50' may be disposed and adjusted such that the control of the power unit 20' based on the position of the center line C of the magnetic pair moveable unit 30' is realized based on the signal output from the magnetic sensing unit 50'.

Herein, the "magnetism sensing" or the "magnetism sensing unit" refers to a device or a process of detecting the magnetic field and transmitting and/or converting the magnetic field into the signal recognizable by the controller. The magnetism sensing unit 50' may detect a change in the magnetic field caused by approach or distancing of the magnetic pair movable unit 30' and transmit the same to the controller 40', and the controller may determine which solenoid among the solenoids 10' to apply the current based on the received signal.

There may be one or more magnetism sensing units 50'. In one embodiment, each magnetism sensing unit 50' may be disposed at an equal position for each solenoid 10' included in the solenoid assembly 100. When an intensity of the magnetic field recognized from the signal output by each magnetism sensing unit 50' is equal to or greater than a predetermined value, the current may be controlled to be applied to the corresponding solenoid, and when the intensity of the magnetic field recognized from the signal output by each magnetism sensing unit 50' is smaller than the predetermined value, the current may be controlled so as not to be applied to the corresponding solenoid. FIG. 7 is a diagram showing an embodiment of the state in which each magnetism sensing unit 50' is disposed at the equal position for each solenoid 10'. In this case, when the intensity of the magnetic field recognized from the signal output from each magnetism sensing unit is smaller than the predetermined value, the current may be controlled so as not to be applied to the corresponding solenoid. Therefore, a multi-stage solenoid actuator in which the current is applied to the solenoid when the magnetic pair moveable unit 30' approaches and the current is not applied to the solenoid when the magnetic pair moveable unit 30' moves away may be implemented. By adjusting the predetermined value, the control shown in FIG. 6 and described above may also be achieved. As such, each solenoid and each magnetism sensing unit may be constructed as one cell via the above control scheme, so that the actuator capable of constantly applying the force to the magnetic pair movable unit as much as the desired length via the continuous extension may be implemented.

In one embodiment, the magnetism sensing unit may be a hall sensor that detects the change in the magnetic field using a hall phenomenon, but may not be necessarily limited thereto.

Figure 8:
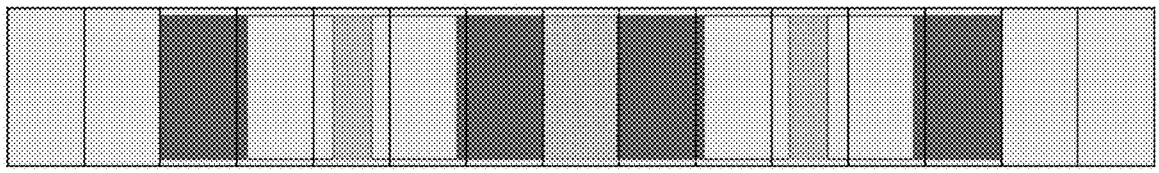
FIG. 8 is a diagram schematically showing a multi-stage solenoid actuator having two magnetic pair movable units.

As described above, there may be one or more magnetic pair movable units. For example, there may be two or more magnetic pair movable units. FIG. 8 is a diagram schematically showing a multi-stage solenoid actuator having two magnetic pair movable units. Referring to FIG. 8, in the case of having two or more magnetic pair movable units, the controller may control the power unit such that the current is applied to the solenoid based on a center line of each magnetic pair movable unit. In the case of having two or more magnetic pair movable units, a spacer that maintains the spacing between the second poles as well as the first poles of the respective magnetic members may be optionally included. As described above, a magnitude of the force applied by the multi-stage solenoid actuator may be increased using two or more magnetic pair movable units.

Hereinafter, embodiments of the present disclosure will be described in detail. However, the embodiments described below are merely some embodiments of the present disclosure, and the scope of the present disclosure is not limited to the following embodiments.

Determination of Geometrical Parameters of Solenoid Actuator

Effects of geometrical parameters of the solenoid actuator on a mechanical performance of the solenoid actuator was investigated via computer simulation. The magnetic field based on the geometric parameters of the solenoid actuator may be expressed as follows.

$$B_{coil,z}(z) = \frac{\mu_0 NI}{2L_c(D-d)}\left\{(L_c+2z)\ln\left[\frac{D+\sqrt{D^2+(L_c+2z)^2}}{d+\sqrt{d^2+(L_c+2z)^2}}\right] + (L_c-2z)\ln\left[\frac{D+\sqrt{D^2+(L_c-2z)^2}}{d+\sqrt{d^2+(L_c-2z)^2}}\right]\right\}e_z$$

Here, D is an outer diameter of the solenoid, d is an inner diameter of the solenoid, Lc is a length of the solenoid, N is the number of turns of the solenoid, I is a magnitude of the current applied to the solenoid, μ0 is a vacuum permeability, and z is axial position coordinates of the solenoid.

The force received by the magnet in the magnetic field as described above may be expressed as follows using the Biot-Savart law.

$$F_{mag,z}(z)=\int_V \rho_m B_{coil,z} dV+\int_S \sigma_m B_{coil,z} dS$$

With the above integral equation, a force function may be expressed as follows using the geometric parameters of the solenoid actuator.

$$F_{mag,z}(z)=\frac{\pi\mu_0 NID_p^2}{8L_c(D-d)}\left\{-(\alpha+2z)\ln\left[\frac{D+\sqrt{D^2+(\alpha+2z)^2}}{d+\sqrt{d^2+(\alpha+2z)^2}}\right]-\right.$$
$$(\beta-2z)\ln\left[\frac{D+\sqrt{D^2+(\beta-2z)^2}}{d+\sqrt{d^2+(\beta+2z)^2}}\right]+(\gamma+2z)\ln\left[\frac{D+\sqrt{D^2+(\gamma+2z)^2}}{d+\sqrt{d^2+(\gamma+2z)^2}}\right]+$$
$$(\delta-2z)\ln\left[\frac{D+\sqrt{D^2+(\delta+2z)^2}}{d+\sqrt{d^2+(\delta+2z)^2}}\right]+(\delta+2z)\ln\left[\frac{D+\sqrt{D^2+(\delta+2z)^2}}{d+\sqrt{d^2+(\delta+2z)^2}}\right]+$$
$$(\gamma-2z)\ln\left[\frac{D+\sqrt{D^2+(\gamma-2z)^2}}{d+\sqrt{d^2+(\gamma-2z)^2}}\right]-(\beta+2z)\ln\left[\frac{D+\sqrt{D^2+(\beta+2z)^2}}{d+\sqrt{d^2+(\beta+2z)^2}}\right]-$$
$$\left.(\alpha-2z)\ln\left[\frac{D+\sqrt{D^2+(\alpha-2z)^2}}{d+\sqrt{d^2+(\alpha-2z)^2}}\right]\right\}e_z$$

Here, M is a magnetization (A/m) of the magnet and Dp is a diameter of the magnet, and when Lc is the length of the solenoid, Lp is a length of one magnetic member, and X is a distance between the center lines of the two magnetic members, $$\alpha=Lc+Lp+X$$

$$\beta=Lc-Lp-X$$

$$\gamma=Lc-Lp+X$$

$$\delta=Lc+Lp-x.$$

A dimensionless equation may be derived by dividing a length-related variable in the equation into Dp, a current-related variable into Ic, a number-related variable into Nc, and a force-related variable into Fc.

$$\tilde{F}_{mag}=f(\tilde{L}_p,\tilde{L}_c,\tilde{X},\tilde{N},\tilde{d},\tilde{d}_w,\tilde{I})$$

Figure 9:
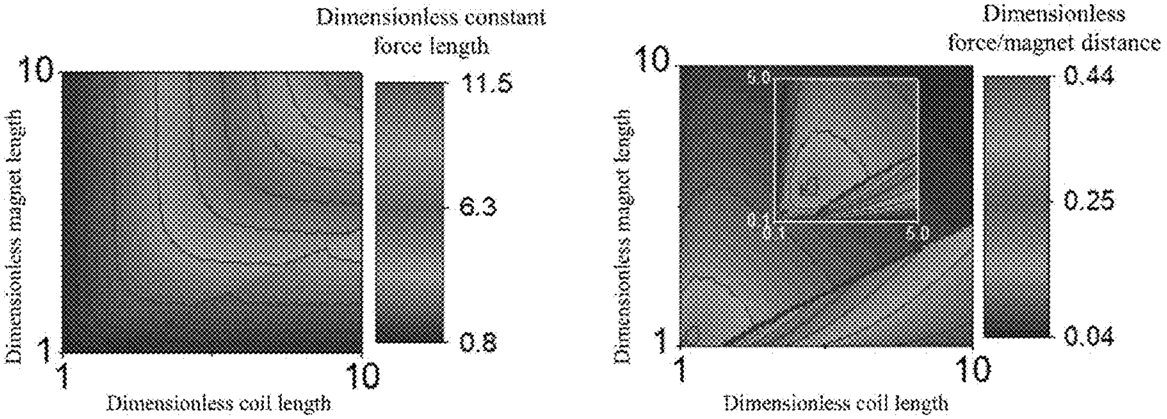
FIGS. 9 and 10 are views showing results based on an experimental example of the present disclosure.

FIG. 9 is a contour showing the equation derived in the above method using computer simulation.

A left side of FIG. 9 is a contour showing a length of the section for receiving the constant force based on a coil length and a magnet length, and a right side is a contour showing a relationship between the coil length, the magnet length, and the length of the section for receiving the constant force when a maximum force may be obtained per length of the magnetic member.

Referring to the left side of FIG. 9, it may be seen that, when the magnetic member is located inside the solenoid, the length of the magnetic member must be equal to or smaller than about half of the length of the solenoid tube, and in particular, the magnetic member has the highest space efficiency when the length thereof is smaller than about half the length of the solenoid tube by about 0.1 times the diameter of the cylinder of the magnetic member. In addition, it may be seen that, when the magnetic member is located outside the solenoid, the magnetic member has the highest space efficiency when the length thereof is substantially equal to the length of the solenoid tub. Referring to the right side of FIG. 9, it may be seen that the numeric value has a maximum value when the length of the solenoid is about 2.5 times the diameter of the magnet and the length of the magnetic member is about 1.1 times the diameter of the magnet.

Configuration of Multi-Stage Solenoid Actuator

Figure 10:
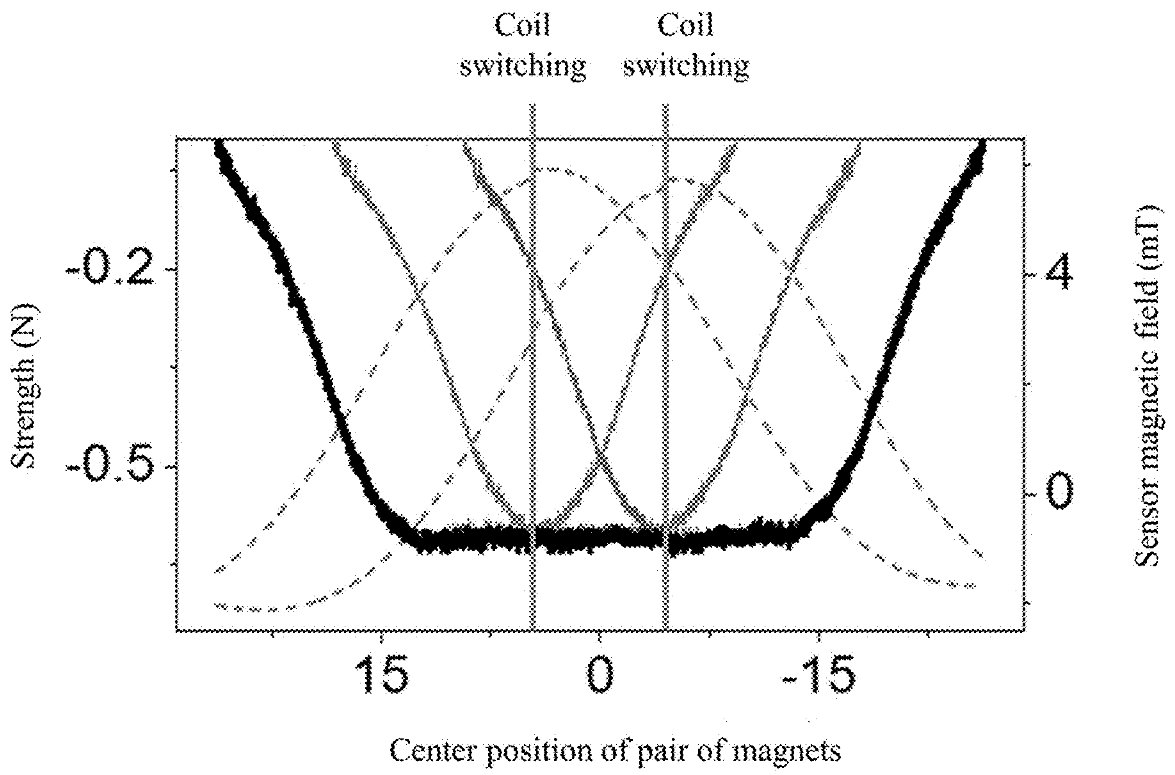

The magnitude of the force received by the magnetic pair movable unit was analyzed by constructing the multi-stage solenoid actuator according to the present disclosure. The hall sensor was used as the magnetism sensing unit. FIG. 10 is a graph showing the results. Red, blue, and green lines in FIG. 10 are lines showing a function of the received force based on the axial position of the magnetic pair moveable unit while passing through each solenoid (or the section of each solenoid). When the magnetic pair moveable unit moves along the axis, the solenoid to which the current is applied is continuously changed, so that the corresponding graph may be changed in an order of red, blue, green or green, blue, red. As a result, the section for receiving the constant force appearing near a center line of each of the red, blue, and green graphs is continuously extended, so that the section for receiving the constant force may be extended as shown by a black line in FIG. 10. Although FIG. 10 shows only three discrete controls, it is theoretically clear that the section for receiving the constant force may be extended as much as desired by repeating the same principle.

Referring to FIG. 10 continuously, each of a red dotted line and a blue dotted line indicates the magnitude of the magnetic field detected by each hall sensor. A trend in which the intensity of the magnetic field increases and then decreases as the magnetic member approaches and moves away appears constantly. Therefore, it may be seen that the control of applying the current to the solenoid when the intensity of the magnetic field exceeds the predetermined value and blocking the current applied to the solenoid when the intensity of the magnetic field falls below the predetermined value is possible.

Although the present disclosure has been described with reference to the preferred embodiment, those skilled in the art will understand that the present disclosure may be modified and changed in various ways without departing from the spirit and scope of the present disclosure described in the claims below.

What is claimed is:

1. A solenoid actuator for transmitting a constant force, the solenoid actuator comprising:

at least two tubular solenoids;

a controller;

a power unit coupled to the controller; and a magnetic pair member having two magnetic members providing magnetic fields formed such that respective first poles thereof face each other and respective second poles thereof different from the first poles are located at both distal ends, and extending through a tube of the at least two tubular solenoids, wherein the controller is configured to control the power unit to apply current to one of the at least two tubular solenoids based on a position of the magnetic pair member, wherein one of a distance between the first poles and a distance between the second poles of the respective two magnetic members is 0.9 to 1.1 times the length of the tube of the at least two tubular solenoids, wherein the solenoid actuator further includes a spacer disposed and fixed between the two magnetic members to keep a distance between the two magnetic members constant when the first poles of the respective two magnetic members are spaced apart from each other.

2. The solenoid actuator of claim 1, wherein the distance between the first poles of the respective two magnetic members is 0.9 to 1.1 times the length of the tube of the at least two tubular solenoids, wherein a length of each of the two magnetic members is 0.9 to 1.1 times the length of the tube of the at least two solenoids.

3. The solenoid actuator of claim 1, wherein the distance between the second poles of the respective two magnetic members is 0.9 to 1.1 times the length of the tube of the at least two solenoids, wherein a length of each of the two magnetic members is equal to or smaller than 0.55 times the length of the tube of the at least two solenoids.

4. The solenoid actuator of claim 3, wherein the at least two tubular solenoids and the two magnetic members are cylindrical, wherein the length of each of the two magnetic members is smaller than 0.55 times the length of the tube of the at least two solenoids by 0.09 to 0.11 times the diameter of the magnetic member.

5. The solenoid actuator of claim 4, wherein the length of the solenoid is 2.3 to 2.7 times the diameter of the magnetic member, and the length of each of the two magnetic members is 1.0 to 1.2 times the diameter of the magnetic member.

* * * * *